United States Patent [19]

Ljung et al.

[11] Patent Number: 4,503,543
[45] Date of Patent: Mar. 5, 1985

[54] RING LASER GYROSCOPE GETTER-HOLDER

[75] Inventors: Bo H. G. Ljung, Wayne; John C. Stiles, Morris Plains, both of N.J.

[73] Assignee: The Singer Company, Little Falls, N.J.

[21] Appl. No.: 399,046

[22] Filed: Jul. 16, 1982

[51] Int. Cl.$^3$ .............................................. H01S 3/083
[52] U.S. Cl. ........................................ 372/94; 372/33; 356/350
[58] Field of Search ..................... 372/94, 33; 356/350

Primary Examiner—William L. Sikes
Assistant Examiner—Léon Scott, Jr.
Attorney, Agent, or Firm—Morris Liss; T. W. Kennedy

[57] ABSTRACT

A resilient serpentine shaped tungsten wire is formed to match a short wire section to hold a ring laser gyroscope getter. The getter-holder assembly is positioned within a stepped oblong bore so that the getter is in firm contact with the bore surface at two points. This prevents resonances of the getter or holder that might otherwise destroy the getter while subjected to vibrations.

8 Claims, 9 Drawing Figures

RING LASER GYROSCOPE GETTER-HOLDER

FIELD OF THE INVENTION

The present invention relates to ring laser gyroscopes and more particularly to a mechanical holder for a non-evaporative getter secured within the block of a ring laser gyroscope.

BRIEF DESCRIPTION OF THE PRIOR ART

A getter consists of a pure sintered metallic alloy, typically consisting of titanium and zirconium. The alloy is sintered together with graphite to obtain a gas permeable structure. This sintered structure is placed in a ring shaped retainer. The getter retainer is located within the block of a ring laser gyroscope in communication with the optical cavity of the gyroscope. The purpose of a getter is to have its sintered metallic alloy material combine with unwanted non-noble gas components desorbed from the interior of the gyro optical cavity during storage and operation of the ring laser gyro. The getter is necessary inasmuch as evacuation and subsequent noble gas fill does not accomplish a lasting cleanliness of the lasing gas. In order to maintain a long lifelength of the ring laser gyroscope, it is important that only noble gases remain in the optical cavity during operation of the gyro.

A getter is somewhat oxidized during handling. The getter needs to be activated at a high temperature, which may typically be 900° C. for one minute. This treatment in a vacuum causes impurities on the surface of each grain in the getter to diffuse towards the interior. The surface is thereby cleaned and is reactivated to absorb contaminating gas molecules, which it can do at room temperature. The high activation temperature puts a large stress on the holder due to thermal expansion. At least part of the getter-holder is also heated to approximately 900° C. The combined stress and high temperature can cause the getter-holder to creep and lose its resiliency. Such a loss in resiliency might cause the getter assembly to be damaged by external vibrations.

BRIEF DESCRIPTION OF THE PRESENT INVENTION

The present invention offers a flexible and resilient ring laser gyroscope getter-holder which is preferably fabricated from a titanium wire bent into a serpentine shape and then wrapped around end to end to form a ring. The ends of the getter cooperate with a separate short length or wire to form a clamp which secures a ring-shaped getter at diametrically opposite points thereof. By forming a stepped bore section within the body of the ring laser gyroscope, the resilient getter will "snap" into place within the bore section. In effect, the getter is secured to the holder and also contacts two points within the bore so that a non-resonant system is formed.

The above-mentioned objects and advantages of the present invention will be more clearly understood when considered in conjunction with the accompanying drawings, in which:

DETAILED DESCRIPTION OF THE INVENTION

Figure 1:
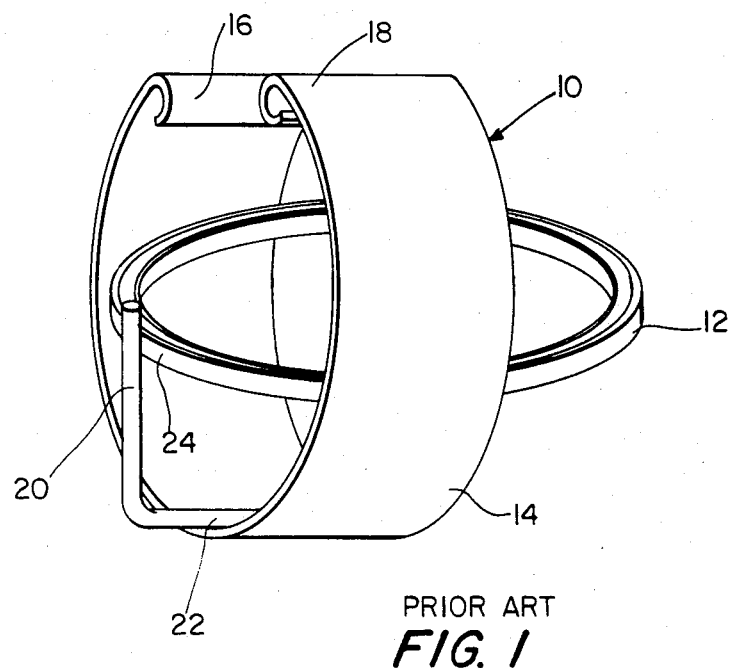
FIG. 1 is a perspective view of a prior art ring laser gyroscope getter-holder.
Figures 2A, 2B:
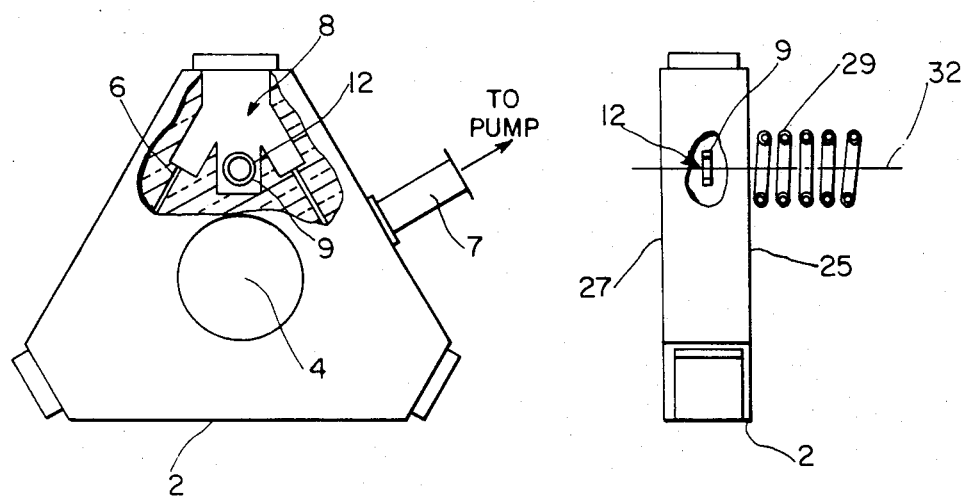
FIG. 2A is a schematic cut-away top view of a ring laser gyroscope illustrating the position of a getter therein.
FIG. 2B is a side elevational schematic representation of the ring laser gyroscope of FIG. 2A indicating the disposition of an RF coil adjacent thereto.

FIG. 1 illustrates a prior art holder generally indicated by reference numeral 10 and is seen to support a ring laser gyroscope getter 12, the latter typically being fabricated from a pure metal alloy such as titanium and zirconium. FIG. 2A illustrates the position of the getter 12 within a triangular body of a ring laser gyroscope 2. Typically, the gyroscope 2 oscillates about an input axis 4 and lasing gases generate monochromatic light along a generally triangular optical path including straight optical cavity sections such as 6 interconnected by a large corner recess generally indicated by reference numeral 8. A getter 12 is located within a bore 9 formed within the body of the RLG within the vicinity of the recess 8. The axis of the circularly shaped getter is parallel to the input axis 4.

FIG. 2B is a schematic side view illustration of the getter 12 within bore 9, the bore being formed between an upper face 27 of the gyro body and a lower face 25. An RF coil 29 is positioned against the face 25 of the gyro and the coil axis is coaxial with the axis of the getter bore 9.

During fabrication of a ring laser gyroscope, the optical cavity is evacuated through an outlet 7 shown in FIG. 2A. However, inasmuch as it is impossible to maintain a perfect vacuum, gases will be desorbed from the walls in the optical cavity. The contaminated lasing gas will lose its ability to provide gain in the optical cavity and therefore seriously affect the lifetime of the gyro. Accordingly, when the cavity of the gyro is fully evacuated, the getter 12 is heated to incandescence at a typical temperature of 900° C. The temperature is held for a typical time period of 1-2 minutes and the gyro is then backfilled with noble gas and sealed off. In order to energize the getter to incandescence, the RF coil 29 is excited with a typical frequency of 0.5 to 30 MHz at a power level of approximately 5 kw. The getter surface is quite pure for continued combining with extraneous non-noble gas molecules which may leak into or get desorbed from the walls of the optical cavity in small quantities at room temperature.

The prior art getter-holder 10 shown in FIG. 1 includes a strip of stainless steel which is fashioned to a cross section generally resembling the letter "C". The body of the holder 14 has turned-down edges 16 and 18 while a perpendicularly shaped wire 20 is appropriately welded at end 24 to the getter 12 and at 22 to the body of the holder 14. As illustrated, the axis of the holder is generally perpendicular to the axis of the getter.

With the getter-holder assembly of FIG. 1 positioned as shown in FIG. 2A, several problems will occur during operation of the ring laser gyroscope. Primarily, the holder material absorbs some of the RF energy from coil 30 and becomes hot. Due to the "C" shape of the holder, stresses develop in the holder and it has been noted that at times the stresses are high enough to reduce the frictional force between the getter-holder and bore 9. This resulted in movement of the getter within the bore when the ring laser gyroscope was subjected to vibrations which, of course, is unacceptable.

Further, it was found with the prior art getter-holder 10 that, although the getter is itself quite light in weight, the supporting perpendicularly shaped wire 20 is rather stiff and acts as a low resonance suspension with a resonant frequency in the domain below 2 kHz. Because of low damping, when a ring laser gyroscope vibrates, the amplitude of the getter vibration is high enough to break the connection between getter 12 and wire 20.

Figure 3A:
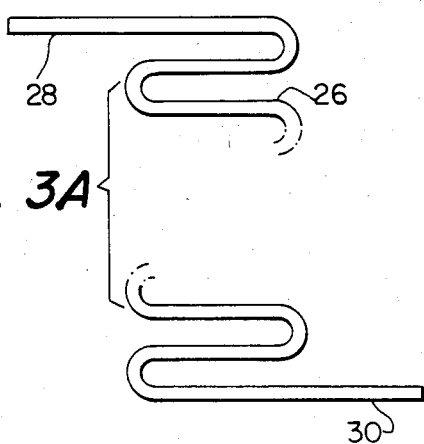
FIG. 3A is an illustration showing the serpentine shape of the present getter-holder.
Figure 3B:
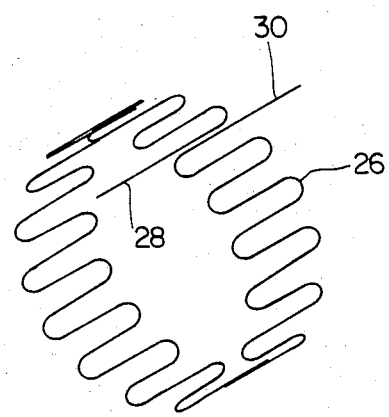
FIG. 3B is a partially fabricated getter-holder, in accordance with the present invention.

FIG. 3A illustrates the serpentine shape of a tungsten wire 26 which forms the basis of the present invention, namely, an improved getter-holder. FIG. 3B illustrates the folding or wrapping of the serpentine wire to form a ring-like configuration with ends 28 and 30.

Figure 4:
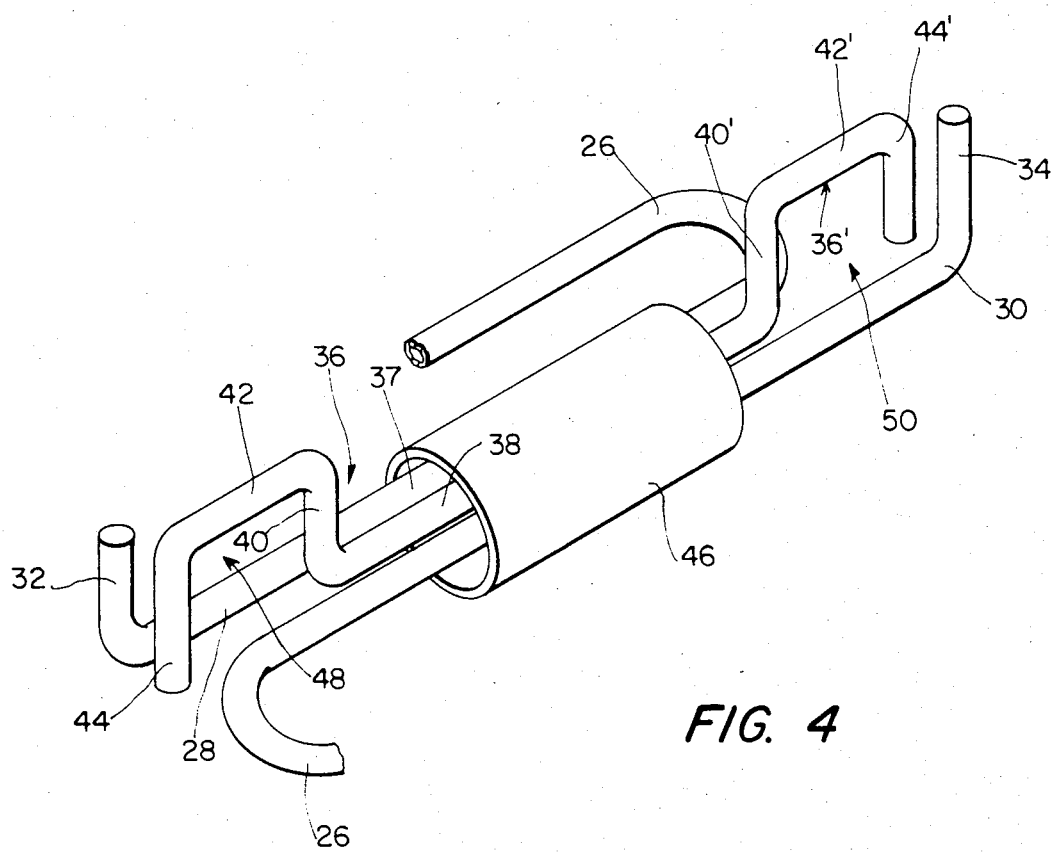
FIG. 4 is a partial perspective view illustrating the clamping section of the assembled getter-holder.
Figure 5:
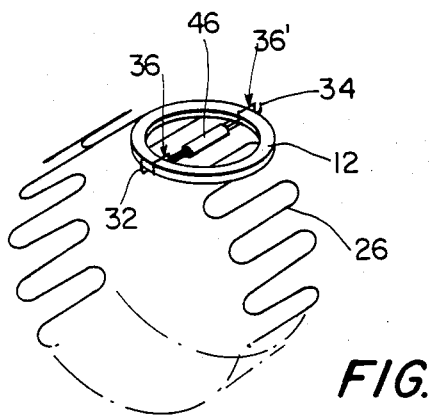
FIG. 5 is a perspective view illustrating the mounting of a getter to the present serpentine getter-holder.

FIG. 4 illustrates the completion of the improved getter-holder in the vicinity of the serpentine wire ends 28, 30 (FIG. 3B) which are bent to form means for clamping a getter against the holder as shown in FIG. 5. Considering the detailed illustration in FIG. 4, the end 28 of the serpentine wire is bent perpendicularly to form a right angle bend as indicated by reference numeral 32 while a similar situation exists for the opposite end 30 wherein a bend 34 is fashioned. The upturned ends 28 and 30 are positioned in parallel spaced relationship to one another. A short section of wire 38 cooperates with the bends 32 and 34 to form means for clamping the getter. A central section 37 of the shortened wire 38 has its end portion 36 bent in several directions to form a generally inverted U-shape including a first bend 40, generally perpendicular to the central section 37 and thereafter the wire articulates to a straightened section 42, generally parallel to central section 37. Thereafter, a down-turned end section 44 is positioned against bend 32 leaving an opening 48 through which a segment of getter 12 may pass and be clamped. A similar situation exists at an opposite end section 36' of the shortened wire 38. Here, sections 40', 42' and 44' correspond to the same numbered sections on the opposite side of shortened wire 38. A stainless steel sleeve 46 surrounds the bent wire sections just described as well as an adjacently located portion of the serpentine wire 26.

FIG. 5 illustrates the mounting of getter 12 to the serpentine wire 26 by the clamping means just described.

Figure 6:
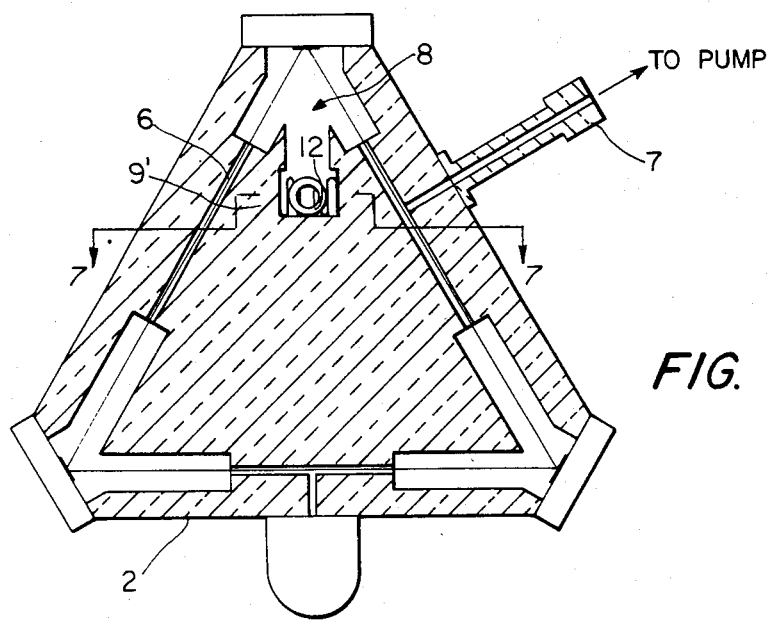
FIG. 6 is a top plan view illustrating a getter and its holder, in accordance with the present invention but simplified for illustrative purposes.
Figure 7:
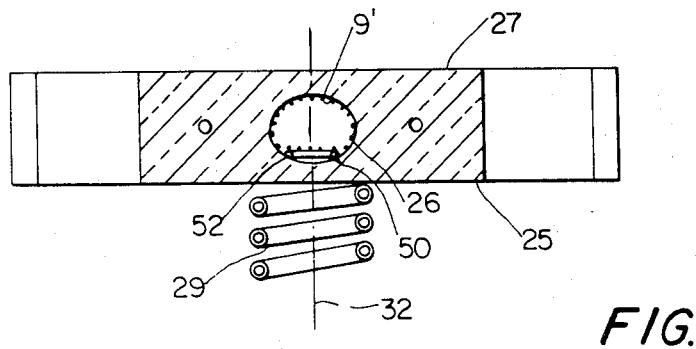
FIG. 7 is a sectional view taken along a plane passing through section line 7—7 of FIG. 6 which illustrates the disposition of a getter and getter-holder wire within a stepped oblong bore.

FIGS. 6 and 7 illustrate a stepped bore portion of oblong profile 9' formed in a corner recess 8.

FIG. 7 illustrates in detail the disposition of getter 12 within the oblong bore 9' so that the getter 12 contacts the bore at points 50 and 52 while being coaxial with coil 29 so that the coil generated flux transfer may be maximized through getter 12.

A distinct advantage of the present getter-holder is that no welds are required. Welds are quite difficult to make with the materials and shapes involved. When the getter-holder assembly is positioned within the stepped bore, as shown in FIG. 7, the getter will contact the bore at two points 50 and 52. Such contact does not impede the heating of the getter in a vacuum environment at a temperature of 900° C. Because the area of contact is so small, there is very little heat flow from the getter at the point of contact. This loss is somewhat compensated for due to the fact that the getter may be located somewhat closer to an RF coil as compared with the prior art so that more RF energy may be delivered to the getter.

By having the getter 12 pushed against the stepped bore section by the resilient serpentine wire to contact the bore at two points 50 and 52, a nonresonant system is formed. At least, no resonance below 2 kHz has been found.

The choice of tungsten wire for the serpentine wire achieves two effects. First, the tungsten can withstand high temperature without softening. In fact, the reverse is true. Second, the tungsten has a rather high electrical resistance which reduces the current induced from RF coil 29 thus reducing the heat developed within the holder.

The shape of the holder results in a relatively long length and commensurate higher resistance coupled with a small cross section when compared to the prior art. This substantially reduces the heat generated in the holder when the getter is energized. Due to the low spring rate of the serpentine wire as compared with the "C" shaped holder of the prior art (FIG. 1), the expansion in the serpentine wire causes only moderate stress in the tungsten material.

It is well known that tungsten wire which is heated becomes brittle. Thus, after initial forming of the getter-holder assembly, the tungsten serpentine wire may be strengthened by a heat treatment.

An additional advantage of the present invention is that the getter-holder utilizes wire as opposed to the flat stock of the prior art getter-holder 10. Flat stock must be carefully deburred, which is costly.

In order to assure minimum movement of the getter-holder within the stepped bore section, it is preferable that the bore be milled so that the bore has a generally oblong profile. The oblong shape has the additional advantage of being more easily cleaned, after machining, than a stepped bore of circular profile.

Thus, according to the advantages set forth, the present invention offers a marked improvement in manufacture, performance and reliability when compared with the prior art.

It should be understood that the invention is not limited to the exact details of construction shown and described herein for obvious modifications will occur to persons skilled in the art.

We claim:

1. In a ring laser gyroscope, a getter-holder comprising:
   a resilient member having outer ends and contoured in a generally ring shaped configuration;
   the ends of the member formed to contact two points of a getter;
   means mating with the member ends for clamping the contacted getter points therebetween; and
   means encircling the mating means, a median section of the resilient member, and the ends of the member for retaining clamping action of the getter.

2. The structure set forth in claim 1 wherein the length of the resilient member is formed in a serpentine shape.

3. The structure set forth in claim 2 wherein the encircling means comprises a sleeve member located in generally parallel relation with the encircled mating means, the section of the resilient member and the member ends.

4. The structure set forth in claim 3 wherein the resilient member ends comprise right angle bends extending in a first direction and further wherein the mating means includes a section of wire having inverted generally U-shaped bends at the ends thereof extending in a second direction, opposite the first, wherein openings are created between each right angle bend and corresponding U-shaped bend for receiving the getter therebetween.

5. The structure set forth in claim 4 wherein a ring laser gyroscope has a stepped bore formed in the body thereof for retaining the holder therein, the bore having an oblong profile and contacting two points of a getter thereby substantially eliminating resonance of the getter or holder.

6. The structure set forth in claim 1 wherein the encircling means comprises a sleeve member located in generally parallel relation with the encircled mating means, the section of the resilient member and the member ends.

7. The structure set forth in claim 1 wherein the resilient member ends comprise right angle bends extending in a first direction and further wherein the mating means includes a section of wire having inverted generally U-shaped bends at the ends thereof extending in a second direction, opposite the first, wherein openings are created between each right angle bend and corresponding U-shaped bend for receiving the getter therebetween.

8. The structure set forth in claim 1 wherein a ring laser gyroscope has a stepped bore formed in the body thereof for retaining the holder therein, the bore having an oblong profile and contacting two points of a getter thereby substantially eliminating resonance of the getter or holder.

* * * * *